US012755653B2

(12) United States Patent
Lin et al.

(10) Patent No.: US 12,755,653 B2
(45) Date of Patent: Oct. 6, 2026

(54) STORAGE BOX

(71) Applicant: NETRONIX, INC., Hsinchu County (TW)

(72) Inventors: Jun-Sheng Lin, Hsinchu County (TW); Yi-Chen Pan, Hsinchu County (TW)

(73) Assignee: NETRONIX, INC., Hsinchu County (TW)

( * ) Notice: Subject to any disclaimer, the term of this patent is extended or adjusted under 35 U.S.C. 154(b) by 163 days.

(21) Appl. No.: 18/581,820

(22) Filed: Feb. 20, 2024

(65) Prior Publication Data

US 2024/0304116 A1 Sep. 12, 2024

(30) Foreign Application Priority Data

Mar. 8, 2023 (TW) ................................ 112108426

(51) Int. Cl.
*G09F 3/20* (2006.01)
*G09F 3/02* (2006.01)

(52) U.S. Cl.
CPC ................ *G09F 3/208* (2013.01); *G09F 3/02* (2013.01); *G09F 2003/0216* (2013.01)

(58) Field of Classification Search
CPC ... G09F 3/208; G09F 3/20; G09F 3/02; G09F 2003/0216
USPC ...... 40/5, 124.01, 124.06, 299.01, 312, 313, 40/446, 447, 448, 463, 502, 541, 584
See application file for complete search history.

(56) References Cited

U.S. PATENT DOCUMENTS 4,515,077 A * 5/1985 Davidson ............... B41N 1/248 33/1 G
5,953,840 A * 9/1999 Simson ................... G09F 11/28 40/518
2011/0146119 A1* 6/2011 Wagner ..................... G09F 7/18 40/541
2015/0129666 A1* 5/2015 Butler .................. G06K 19/073 235/492
2021/0331511 A1* 10/2021 Vandam .............. H04L 41/0803

* cited by examiner

*Primary Examiner* — Justin V Lewis
(74) *Attorney, Agent, or Firm* — Rosenberg, Klein & Lee

(57) ABSTRACT

A storage box includes an electronic device, a box body, and an electronic label module, wherein an edition application program of the electronic device sends product information. The electronic label module is disposed on the box body and includes an induction antenna receiving an information stream containing the product information and a current; a rectifier circuit collecting and stabilizing the current; a microprocessor receiving the information stream and converting a format of the product information; and an electronic ink screen receiving the current provided by the rectifier circuit, triggered by the current, and receiving the information stream from the microprocessor, and presenting the product information. The storage box of the present invention can update the picture on the screen and present the product information on the screen without using a power supply.

9 Claims, 5 Drawing Sheets

STORAGE BOX

BACKGROUND OF THE INVENTION

This application claims priority for the TW patent application no. 112108426 filed on 8 Mar. 2023, the content of which is incorporated by reference in its entirety.

Field of the Invention

The present invention relates to a storage box, particularly to a storage box.

Description of the Prior Art

Storage boxes are used to receive and organize products. Food crispers are used to seal food and placed in refrigerators to keep food in a fresh state. If the storage boxes are opaque and numerous, the user is hard to remember the products stored in a certain storage box or the storage box storing the products he wants. Normally, stickers are used to indicate the contents of storage boxes. While the contents in a storage box are changed, the original sticker would be peeled off, and a new sticker will be stuck to the storage box. However, peeling off stickers and applying stickers is inconvenient and affects the appearance of the storage box. Similarly, stickers may be used to indicate the expiry dates of foods in food crispers. However, the problem of peeling off stickers and applying stickers also exist in food crispers.

At present, there is a technology to install electronic labels on storage boxes. However, an electronic label needs batteries, which would increase the volume and weight of the electronic label.

Accordingly, the present invention proposes a storage box to overcome the abovementioned problems and meet the future requirement. The principles and embodiments of the present invention will be described in detail below.

SUMMARY OF THE INVENTION

The primary objective of the present invention is to provide a storage box, wherein a near-field communication (NFC) technology is used to provide current to the electronic label module and update the electronic ink screen by a NFC device, whereby the present invention needn't use any battery, wherefore the present invention can solve the problems of battery replacement and bulky volume.

In order to achieve the abovementioned objective, the present invention provides a storage box, which comprises an electronic device, a box body, and an electronic label module. The electronic device includes an edition application program and an antenna module, wherein the edition application program sends product information. The electronic label module is installed on the box body and includes an induction antenna, a rectifier circuit, a microprocessor, and an electronic ink screen. While the electronic device approaches the induction antenna, the induction antenna wirelessly links to the antenna module to receive an information stream including the product information, wherein the information stream further includes a current. The rectifier circuit is connected with the induction antenna, collecting and stabilizing current. The microprocessor is electrically connected with the induction antenna and the rectifier circuit, receiving the information stream and converting the format of the product information. The electronic ink screen is electrically connected with the rectifier circuit and the microprocessor, receiving the current provided by the rectifier circuit, triggered by the current, receiving the information stream from the microprocessor, and presenting the product information.

In one embodiment, the rectifier circuit includes an energy collecting circuit and a rectifier voltage regulator circuit. The energy collecting circuit is connected with the induction antenna and collects current. The rectifier voltage regulator circuit is connected with the energy collecting circuit, the microprocessor, and the electronic ink screen, rectifying and regulating the current, and providing the current to the microprocessor and the electronic ink screen.

In one embodiment, the electronic label module further includes a wireless transceiver. The wireless transceiver is connected with the induction antenna and the microprocessor and is configured to convert the format of the product information.

In one embodiment, the communication protocol used by the antenna module and the induction antenna is the near-field communication protocol.

In one embodiment, the wireless transceiver processes the information stream based on the NFC protocol.

In one embodiment, while the electronic device does not approach the electronic label module, the electronic ink screen keeps presenting the product information without power supply.

In one embodiment, after receiving the information stream from the microprocessor, the electronic ink screen updates the existing picture to present the product information.

In one embodiment, the electronic label module further includes a controller and a lock device. The controller is electrically connected with the microprocessor; the lock device is electrically connected with the controller. The microprocessor transmits current to the controller; the controller controls the lock device to lock or unlock.

In one embodiment, the electronic ink screen is an electronic paper.

In one embodiment, the electronic device is a smart phone.

DETAILED DESCRIPTION OF THE INVENTION

The technical schemes of the embodiments of the present invention will be described clearly and fully in cooperation with the attached drawings. Obviously, the embodiments described in the specification are not all the embodiments of the present invention but only a portion of the embodiments of the present invention. The other embodiments made by the persons skilled in the art according to the technical thoughts of the present invention are regarded as not contributing non-obviousness and are to be also included by the scope of the present invention.

It should be understood: the terms “comprise” and “include” used in the specification and claims only indicate the existence of characteristics, entireties, steps, operations, elements and/or components but do not exclude the existence or addition of one or more other characteristics, entireties, steps, operations, elements and/or components.

It should be also understood: the terms used in the specification of the present invention are only to describe specified embodiments but not to limit the scope of the present invention. While used in the specification and claims of the present invention, the singular noun, which is described by “one”, “one piece of” or “the”, implies the plural form thereof unless the context indicates another condition clearly.

It should be further understood: the term “and/or” used in the specification and claims of the present invention refers to one or several of the listed items or any possible combination of the listed items, and the present invention includes these combinations.

Figure 1:
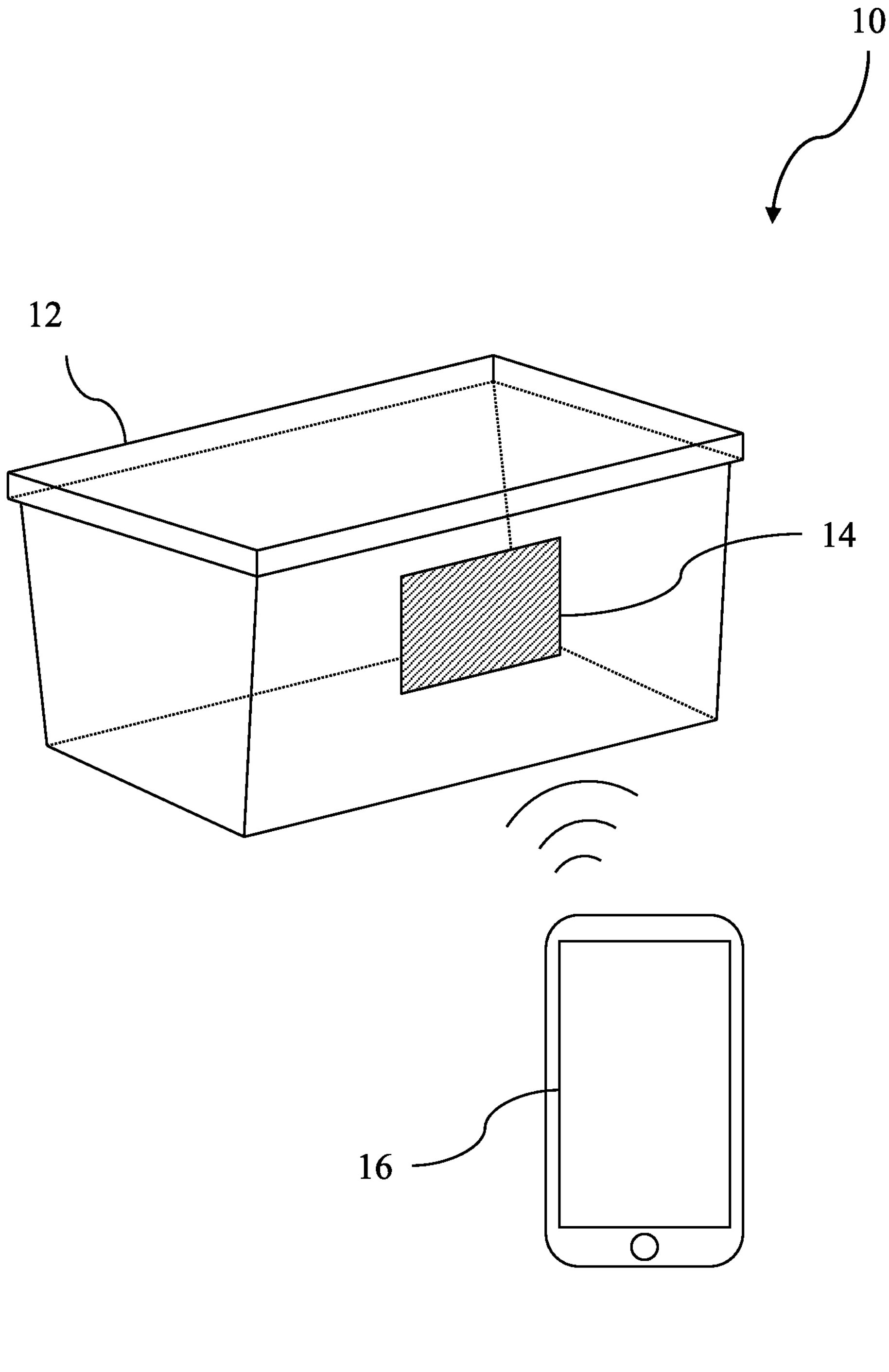
FIG. 1 is a diagram schematically a storage box according to one embodiment of the present invention.

Refer to FIG. 1. FIG. 1 is a diagram schematically a storage box 10 with an electronic label according to one embodiment of the present invention. The storage box 10 with an electronic label comprises a box body 12, an electronic label module 14, and an electronic device 16. The box body 12 may be a storage box, a food crisper, or a transport box. The electronic label module 14 is disposed on the box body 12. In one embodiment, the electronic label module 14 is disposed on the box body 12 in an adhesive method. The electronic label module 14 is configured to present the information of the contents of the box body 12, such as product names, expiry dates, etc. In one embodiment, the electronic device 16 is a smartphone. The electronic device 16 is wirelessly linked to the electronic label module 14 and able to edit the contents that the electronic label module 14 will present and transmit the contents to the electronic label module 14 for presentation.

Figure 2:
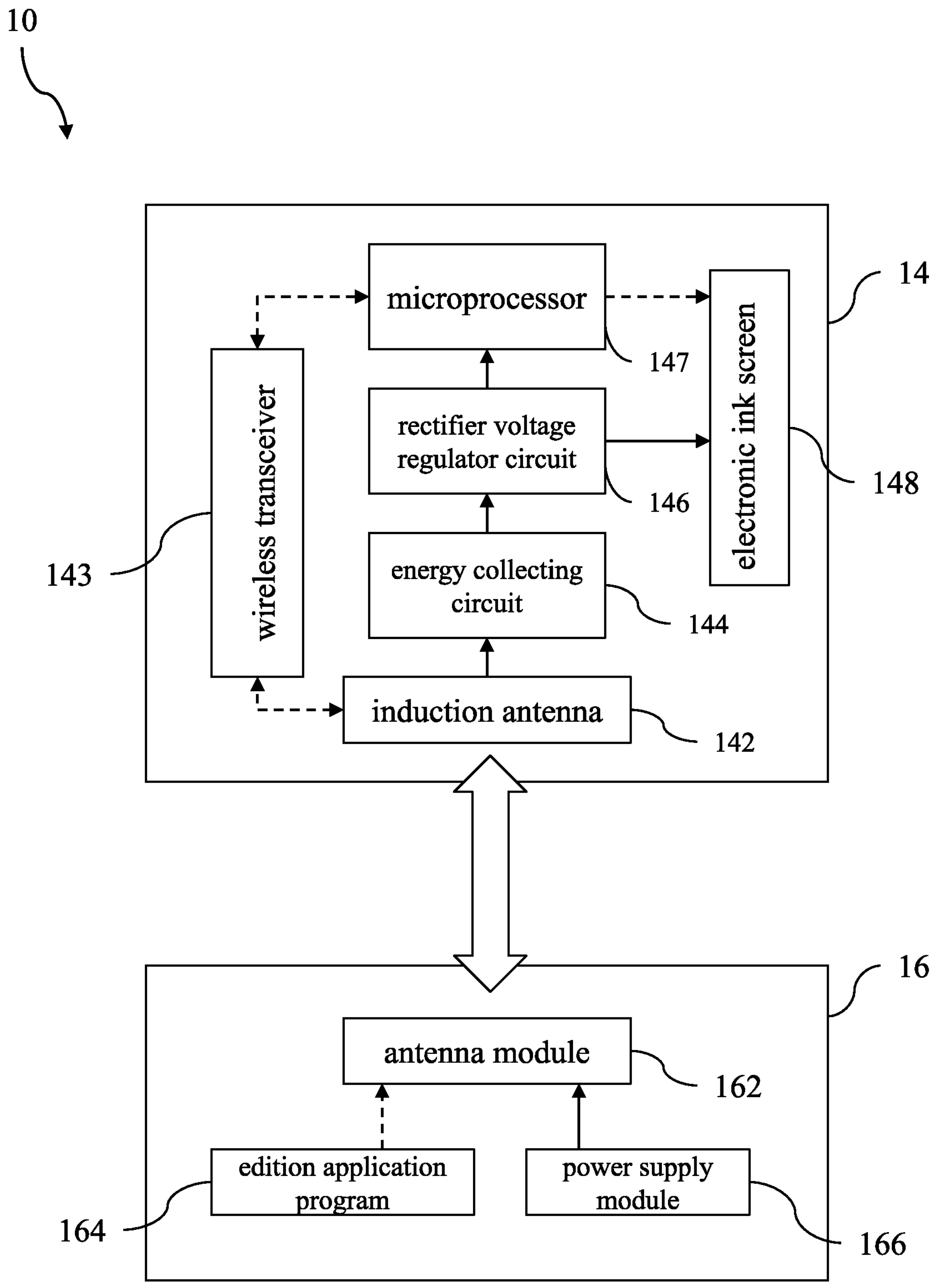
FIG. 2 is a block diagram schematically showing the architecture of a storage box according to one embodiment of the present invention.

Refer to FIG. 2 also. FIG. 2 is a block diagram schematically showing the architecture of a storage box 10 with an electronic label according to one embodiment of the present invention. The electronic device 16 includes an antenna module 162, an edition application program 164, and a power supply module 166. The antenna module 162 interacts with the electronic label module 14 and transmits an information stream containing product information to the electronic label module 14. The user utilizes the edition application program 164 to edit the product information and transmit the product information to the antenna module 162. In one embodiment, the power supply module 166 is the battery of the electronic device 16, providing a current to the information stream to actively induce the electronic label module 14.

The electronic label module 14 includes an induction antenna 142, a rectifier circuit, a microprocessor 147, and an electronic ink screen 148. The induction antenna 142 is configured to sense the ambient wireless signals. While the electronic device 16 is approaching the electronic label module 14, the induction antenna 142 will wirelessly link with the antenna module 162 to receive the information stream from the antenna module 162, wherein the information stream includes the product information. The rectifier circuit is configured to collect and stabilize the current in the information stream. The rectifier circuit includes an energy collecting circuit 144 and a rectifier voltage regulator circuit 146. The energy collecting circuit 144 is connected with the induction antenna 142 and the rectifier voltage regulator circuit 146, collecting current and transmitting the current to the rectifier voltage regulator circuit 146. The rectifier voltage regulator circuit 146 is connected with the energy collecting circuit 144, the microprocessor 147, and the electronic ink screen 148. The rectifier voltage regulator circuit 146 rectifies the current and regulates the voltage and then supplies the current to the microprocessor 147 and the electronic ink screen 148. The microprocessor 147 receives the information stream and converts the format of the product information, which the information stream includes, into the format acceptable by the electronic ink screen 148. The electronic ink screen 148 is electrically connected with the rectifier voltage regulator circuit 146 and the microprocessor 147. The electronic ink screen 148 receives the current provided by the rectifier voltage regulator circuit 146 and is triggered by the current. The electronic ink screen 148 also receives the information stream sent by the microprocessor 147 and presents the product information thereon.

In one embodiment, the electronic label module 14 further includes a wireless transceiver 143. The wireless transceiver 143 is connected with the induction antenna 142 and the microprocessor 147. The wireless transceiver 143 is configured to convert the format of the product information and transmit the information stream, as shown by the dotted-line arrow in the drawing. In one embodiment, the communication protocol used by the antenna module 162 and the induction antenna 142 is the near-field communication protocol. The wireless transceiver 143 is responsible for handling the NFC-based information stream and converting the information stream into a format acceptable by the microprocessor 147. Then, the microprocessor 147 converts the product information in the information stream into a format acceptable by the electronic ink screen 148.

In one embodiment, the electronic ink screen 148 is an electronic paper. The electronic paper has an advantage: no matter what occasion the user is situated, such as in an outdoor environment or under an intense light illumination, the user can always view clearly the text presented by the electronic paper. In other words, the electronic paper is exempted from the problem: the user cannot view clearly the contents presented by the conventional screen or the ordinary paper. Besides, the power consumption of the electronic paper is very low. The electronic paper can maintain the presented text for a very long time without power supply before the text becomes dim gradually. The electronic paper only consumes a tiny amount of current during updating text. After receiving the information stream from the microprocessor 147, the electronic ink screen 148 updates the picture to present the product information. If the electronic ink screen 148 is an electronic paper, the product information will be kept on the electronic ink screen 148 for a very long period of time. Even though the electronic device 16 does not approach the electronic label module 14, the electronic ink screen 148 (the electronic paper) can still present the product information without power supply. After the contents of the box body 12 are changed, the text on the electronic ink screen 148 needs to be changed also. In such a situation, the user utilizes the edition application program 164 to input new product information into the electronic device 16; then the user moves the electronic device 16 to approach the electronic label module 14 for updating the text presented by the electronic ink screen 148.

Figure 3:
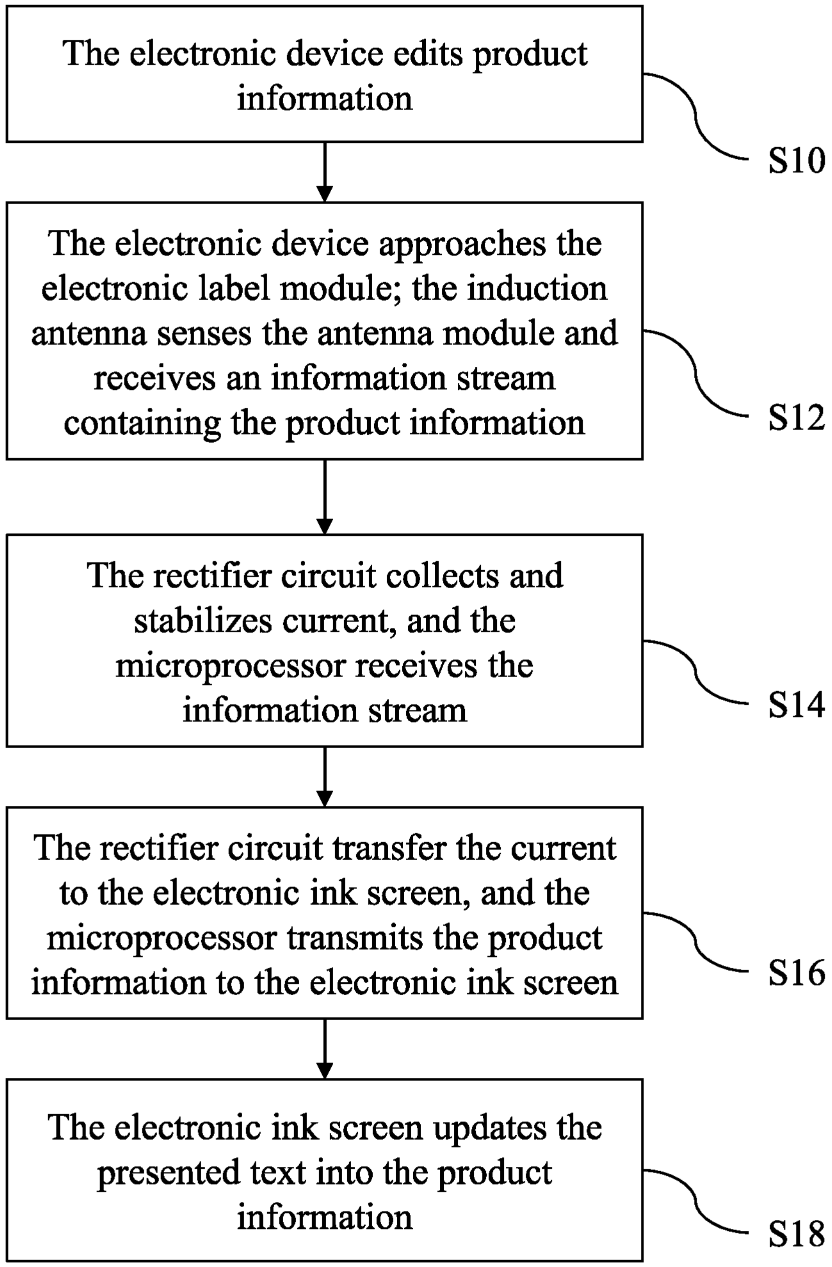
FIG. 3 is a flowchart of the operation of a storage box according to one embodiment of the present invention.

Refer to FIG. 3 also. FIG. 3 is a flowchart of the operation of a storage box according to one embodiment of the present invention. In Step S10, while intending to place a product in the box body 12, the user utilizes the edition application program 164 of the electronic device 16 to input the product information. Next, in Step S12, the user moves the electronic device 16 to approach the electronic label module 14 to make the induction antenna 142 to sense the antenna module 162 and receive the information stream containing the product information, wherein the information stream also includes a current. Next, in Step S14, the rectifier circuit (including the energy collecting circuit 144 and the rectifier voltage regulator circuit 146 in sequence) collects and stabilizes the current; the wireless transceiver 143 transmits the information stream to the microprocessor 147. Next, in Step S16, the rectifier voltage regulator circuit 146 of the rectifier circuit transfers the current to the electronic ink screen 148; meanwhile, the microprocessor 147 transmits the product information to the electronic label screen 148, whereby the electronic ink screen 148 has sufficient power to update the presented contents into the product information, which the microprocessor 147 transmits.

In one embodiment, the product information may be in form of text or a barcode. The barcode may include a website. The user may use the electronic device 16 to scan the barcode and link the electronic device 16 to the website for reading the contents. The product information may include the product name, the expiry date, and the ingredients. Sometimes, a product has complicated ingredients, and the electronic ink screen 148 is hard to present all the ingredients of the product. In the case that a product has too much information to be presented on the electronic label module 14 and the electronic ink screen 148 cannot present all the information, the product information may be in form of a barcode.

If the box body 12 has been placed in a refrigerator, updating the product information should be performed after the electronic label module 14 has been restored to the ambient temperature. Otherwise, the induction antenna 142 may be unable to sense the antenna module 162.

Figure 4:
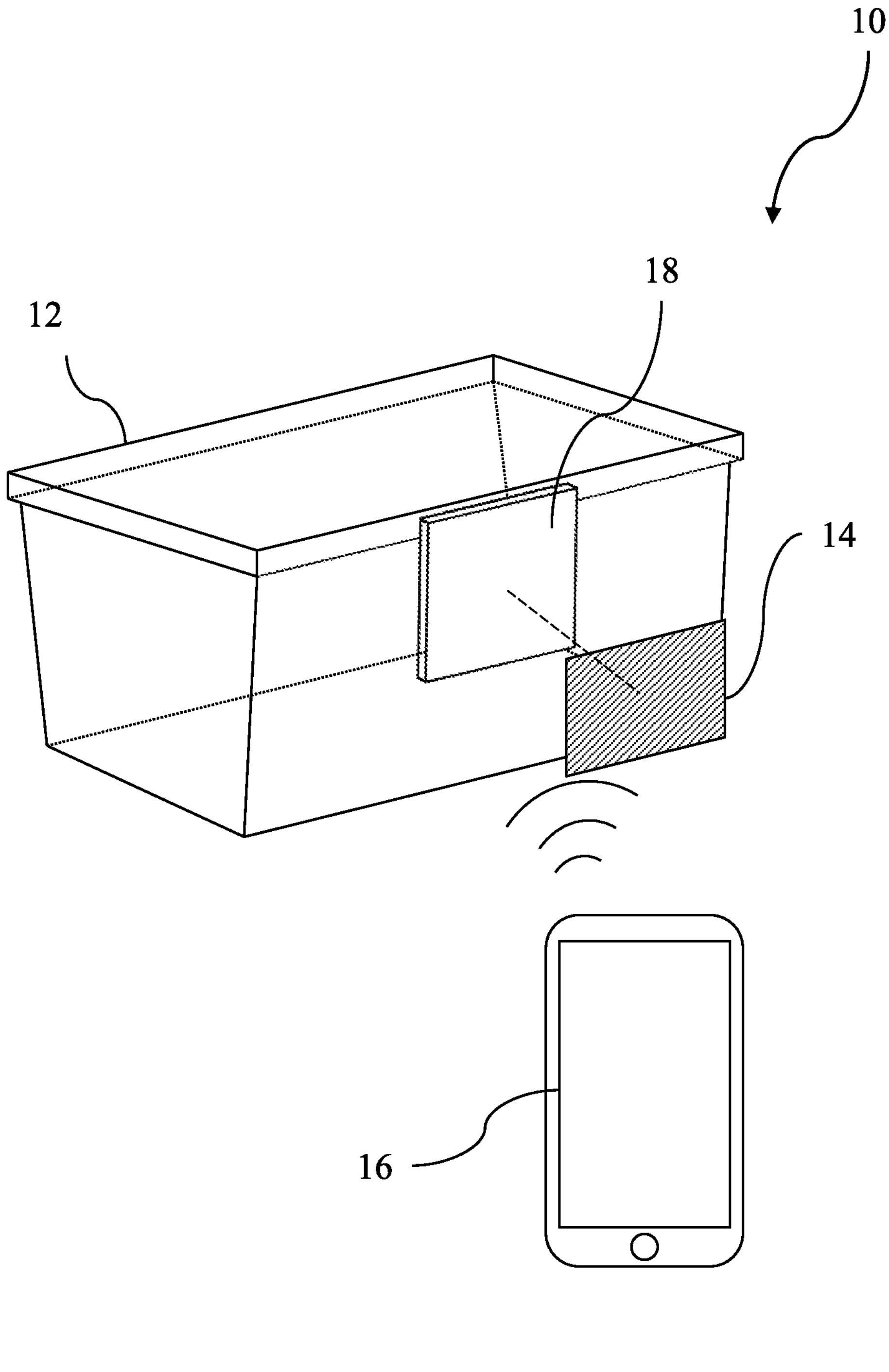
FIG. 4 is a diagram and a block diagram schematically showing a storage box, which further comprises an electronic lock, according to another embodiment of the present invention.
Figure 5:
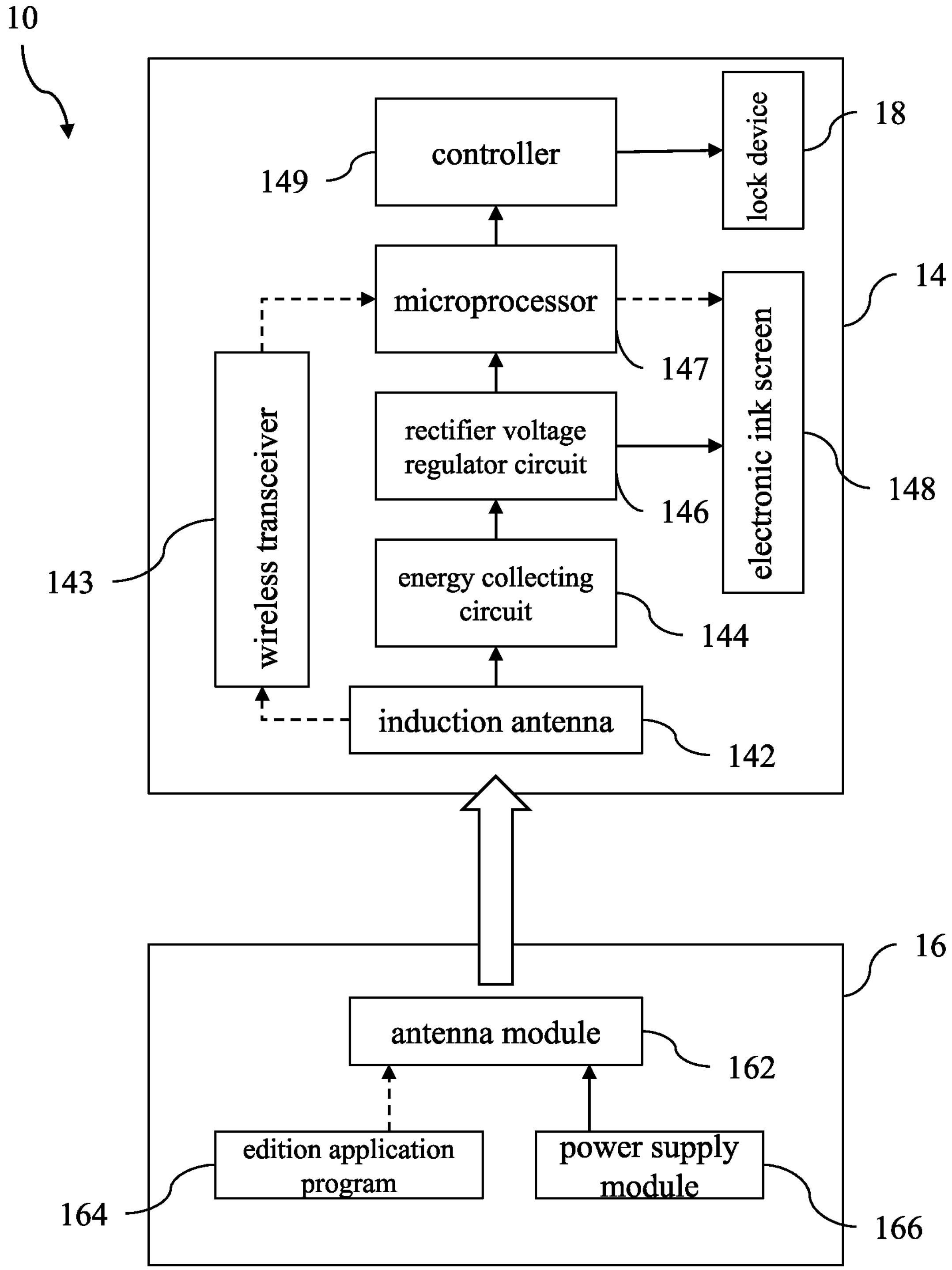
FIG. 5 is a block diagram schematically showing the architecture of a storage box, which further comprises an electronic lock, according to another embodiment of the present invention.

Refer to FIG. 4 and FIG. 5. FIG. 4 and FIG. 5 are respectively a diagram and a block diagram schematically showing a storage box according to another embodiment of the present invention. In the embodiment, the electronic label module 14 is integrated with an electronic lock; the electronic lock does not have its own power supply module but is powered by the electronic device 16 to perform locking or unlocking. As shown in FIG. 4, the lock device 18 of the present invention is an electronic lock. While the electronic device 16 is approaching the electronic label module 14, the induced current will drive the lock device 18 to lock or unlock the box body 12. As shown in FIG. 5, the electronic label module 14 further includes a controller 149 and a lock device 18, in addition to the elements shown in FIG. 2. The controller 149 is electrically connected with the microprocessor 147 and the lock device 18. While the electronic device 16 is approaching the electronic label module 14, the induction antenna 142 is wirelessly linked to the antenna module 162 to receive the current in the information stream. The energy collecting circuit 144 collects the current from the induction antenna 142 and transfers the current to the rectifier voltage regulator circuit 146. The rectifier voltage regulator circuit 146 rectifies the current and stabilizes the voltage and then provides the current to the microprocessor 147, the controller 149 and the lock device 18. The lock device 18 is an electromagnetic switch, which needs electric power to operate. The controller 149 may transfer the current to the lock device 18 to change the state of the lock device 18, e.g., to change the locking state to the unlocking state or change the unlocking state to the locking state. In the present invention, the lock device 18 is integrated with the electronic label module 14. Therefore, the lock device 18 is different from the ordinary electronic lock and able to present information through the electronic ink screen 148.

In conclusion, the present invention provides a storage box, whose electronic label module and electronic device have the NFC function. The electronic device with the NFC function can update the presented contents of the electronic ink screen and provide current to the electronic label module, which is free of power supply. Therefore, the present invention not only can present detailed production information on a storage box but also can overcome the conventional problems of bulky volume and battery replacement.

The embodiments described above are only to exemplify the present invention but not to limit the scope of the present invention. Any equivalent variation or modification according to the characteristics or spirit of the present invention is to be also included by the scope of the present invention.

What is claimed is:

1. A storage box, for receiving an information stream containing product information from an electronic device which comprises an antenna module while approaching the electronic device, the storage box comprising:

a box body; and an electronic label module installed on the box body and comprising:

an induction antenna receiving an information stream while the electronic device approaches the induction antenna, wherein the information stream includes the product information and a current;

a rectifier circuit connected with the induction antenna and configured to collect and stabilize the current;

a microprocessor electrically connected with the induction antenna and the rectifier circuit and configured to receive the information stream and perform a format conversion of the received information stream into a displayable data format for the product information; and an electronic ink screen electrically connected with the rectifier circuit and the microprocessor, the electronic ink screen receiving the current collected and stabilized by the rectifier circuit, triggered by the current, receiving the information stream converted into the displayable data format by the microprocessor, and presenting the product information.

2. The storage box according to claim 1, wherein the rectifier circuit comprises:

an energy collecting circuit connected with the induction antenna and configured to collect the current; and a rectifier voltage regulator circuit connected with the energy collecting circuit, the microprocessor, and the electronic ink screen, the rectifier voltage regulator circuit rectifying and regulating the current and providing the current to the microprocessor and the electronic ink screen.

3. The storage box according to claim 1, wherein the electronic label module further comprises a wireless transceiver connected with the induction antenna and the microprocessor and configured to perform the format conversion for the information stream of the product information.

4. The storage box according to claim 3, wherein the wireless transceiver processes the information stream based on a near-field communication (NFC) protocol.

5. The storage box according to claim 1, wherein a communication protocol used by the antenna module and the induction antenna is a near-field communication protocol.

6. The storage box according to claim 1, wherein while the electronic device does not approach the electronic label module, the electronic ink screen keeps presenting the product information without power supply.

7. The storage box according to claim 1, wherein after receiving the information stream from the microprocessor, the electronic ink screen updates an existing picture to present the product information.

8. The storage box according to claim 1, wherein the electronic label module further comprises a controller and an electric lock device; the controller is electrically connected with the microprocessor; the electric lock device is electrically connected with the controller; the microprocessor transmits the current to the controller; the controller controls the electric lock device to lock or unlock.

9. The storage box according to claim 1, wherein the electronic ink screen is an electronic paper.

* * * * *